United States Patent
Knyazkov et al.

(10) Patent No.: US 6,375,199 B1
(45) Date of Patent: Apr. 23, 2002

(54) WHEEL-MOUNTED VEHICLE AND PNEUMATIC TIRE FOR SAID VEHICLE

(76) Inventors: Vadim Nikolaevich Knyazkov, kv.53, kor.1, d.61, Shipilovskij pr., Moscow 115582 (RU); Valery Vladimirovich Remizov, kv.37, d.36, ul. Garibaldi, Moscow 117393 (RU); Alexandr Dmitrievich Sedykh, kv.397, kor.3, d.69, Leninskiy pr., Moscow 117296 (RU); Nikolai Vasilievich Mikhailov, kv.203, d.71/32, ul. Novocheremushkinskaya, Moscow 117418 (RU); Evgeniy Vasilievich Klimanov, kv.37, d.3, ul. Bestuzhevykh, Moscow 127577 (RU)

(*) Notice: Subject to any disclaimer, the term of this patent is extended or adjusted under 35 U.S.C. 154(b) by 0 days.

(21) Appl. No.: 09/485,894

(22) PCT Filed: Aug. 19, 1998

(86) PCT No.: PCT/RU98/00270

§ 371 Date: Feb. 17, 2000

§ 102(e) Date: Feb. 17, 2000

(87) PCT Pub. No.: WO99/08923

PCT Pub. Date: Feb. 25, 1999

(30) Foreign Application Priority Data

Aug. 20, 1997 (RU) .............................. 97114266
Jun. 24, 1998 (RU) .............................. 98111653

(51) Int. Cl.$^7$ ................................. B60C 5/00
(52) U.S. Cl. ........................... 280/29; 152/454
(58) Field of Search ................ 280/29; 152/454

(56) References Cited

U.S. PATENT DOCUMENTS 4,693,290 A    9/1987  Curtis et al.
6,135,468 A  * 10/2000  Lee ........................... 280/80.1

FOREIGN PATENT DOCUMENTS

| GB | 2 187 690 | 9/1987 |
| RU | 2005083 | 12/1993 |
| RU | 2042530 | 8/1995 |
| RU | 2042560 | 8/1995 |
| RU | 2084366 | 7/1997 |

* cited by examiner

Primary Examiner—Brian L. Johnson
Assistant Examiner—Matthew Luby
(74) Attorney, Agent, or Firm—Dellett and Walters

(57) ABSTRACT

A wheel-mounted floating vehicle with superlow pressure tires which creates average ground pressure 0.008–0.009 MPa and does not destroy vegetal soil layer. The ratio of the total mass of the vehicle to the product of the overall diameter (D) of the tire, the section width (B) and the number of wheels fitted with tires ranges between 0.001–0.006 MPa, and the ratio of the mass of each tire to interior volume thereof lies within the limits of 35–80 kg/M3. The radial deflection of the tire with atmospheric interior pressure under the influence of the own mass of the wheel fitted with the tire ranges between 15–45 % of section height (H) of the tire. The interior pressure in the tire varies from 0,005 MPa up to 0,05 MPa.

Figure 1:
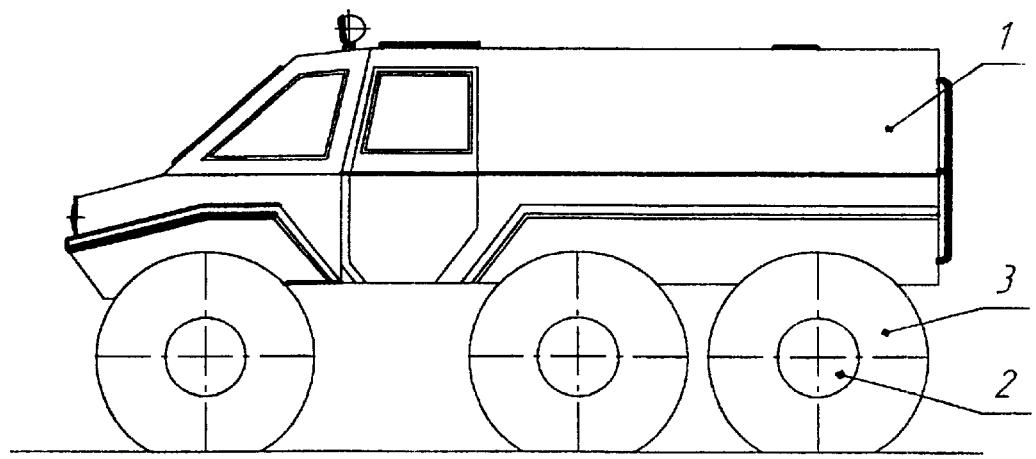

The invention is particularly intended for use in permafrost regions, in the tundra, in swamped areas, in sand deserts as well as in other remote regions.

2 Claims, 3 Drawing Sheets

WHEEL-MOUNTED VEHICLE AND PNEUMATIC TIRE FOR SAID VEHICLE

FIELD OF THE INVENTION

The present invention relates to cross country floating vehicles and pneumatic tyres for such vehicles.

BAGROUND OF THE INVENTION

Wheel-mounted vehicles with pneumatic tyres are known, for which total displacement of wheels fitted with tyres allows them to cross water obstacles, not resting on bottom (RU No. 2042560, B 62D 61/00, 1995).

Such vehicles work on deformable grounds successfully also with a carrying capacity more than 0.05 MPa without destruction of a vegetal soil layer. However moving on the grounds with a carrying capacity less than 0.05 MPa such vehicles have problems of increase of their cross country ability, fuel economy, and also safety of a vegetal soil layer because of its considerable deformation.

Carrying capacity of a ground hereinafter is understood to be a contact pressure, at which there is spontaneous subsiding of a ground.

The wheel-mounted vehicles with pneumatic tyres are known also, for which total displacement of wheels fitted with tyres allows them to cross water obstacles, not resting on bottom, and the ratio of a mass of each tyre to its interior volume varies between 5.0–70.0 kg/m³ (RU No. 2084366, B 62D 57/00, B 62D 61/00, 1997).

Such vehicles can work on deformable grounds with a carrying capacity more than 0.03 MPa without destruction a vegetal soil layer.

However the problems of an increase of cross country ability and fuel economy, and also safety of a vegetal soil layer remain for these vehicles on grounds with a carrying capacity 0.03 MPa and less.

The pneumatic tyres containing side walls and ground engaging portion are known, for which the thicknesses of the side walls and of the ground engaging portion are identical and range between 0.01–0.015 of the section height (RU 2005083, B 60C 5/00, 1993).

Such tyres can work with interior pressure 0.01 MPa and do not ensure average pressure in a contact zone with a ground less than 0.02 MPa. If interior pressure in the tyre is less than 0.01 MPa cross folds appear on the thin ground engaging portion of the tyre, which create increased local pressures on the ground destroying a vegetal soil layer. Therefore vehicles with such tyres can work without destruction of a vegetal soil layer only on grounds with a carrying capacity more than 0.03MPa. Moving of the vehicles with such tyres without destruction of a vegetal soil layer is rather problematic on grounds with a carrying capacity 0.03 MPa and less.

Pneumatic tyres containing side walls, ground engaging tread portion and double-ply cord carcass are known also, with thickness of the carcass in a ground engaging tread portion and side walls equal 0.003–0.08 of section height of the tyre with interior pressure in it 0.01–0.03 MPa. (RU 2042530, B 60C 5100, 5/12, 1995).

If interior pressure is lower 0.01 MPa folds appear on the side walls of such tyres and it promotes an increase of rolling resistance and a deterioration of a controllability of the vehicles.

Therefore while moving with such tyres on grounds with a carrying capacity 0.03 MPa and less there are problems also of increase of cross country ability and safety of a vegetal soil layer, which have not been soluted in a known level of engineering.

SUMMARY OF THE INVENTION

Object of the invention is the creation of a cross country floating vehicle capable to work efficiently on deformable grounds with a carrying capacity 0.03 MPa and less without destruction of a vegetal soil layer, and of a pneumatic tyre for said vehicle working with interior pressure 0.005 MPa.

This problem is soluted by means of such design relations and parameters of a vehicle and a pneumatic tyre for said vehicle which provide engineering results in the form of increase of cross country ability and fuel economy of the vehicle on deformable grounds with a carrying capacity 0.03 MPa and less saving a vegetal soil layer, and also in the form of increase of the velocity of its moving on water and facilitation of its moving out of water on coast and ice.

For this purpose in the wheel-mounted vehicle containing the wheels fitted with pneumatic tyres, the total mass of the vehicle is connected with the tyre dimensions by the following relation:

$$\frac{M}{DBn} 10^{-5} = 0.001 - 0.006 \text{ MPa},$$

where:
M—total mass of the vehicle, kg
D—overall diameter of the tyre, m
B—section width of the tyre, m
n—number of wheels of the vehicle, and the ratio of a mass of each tyre to its interior volume varies between 35–80 kg/m³.

The number n of wheels in the vehicle equals three or more.

The indicated relation connecting a total mass of the vehicle with the dimensions of the tyre, defines its conventional ground pressure. The real ground pressure depends on a total rigidity of the wheels fitted with pneumatic tyres characterized by the ratio of a mass of each tyre to its interior volume, and defines cross country ability, fuel economy and capacity of the vehicle to move on different grounds without destruction their vegetal soil layer.

Utiltzation of the claimed totality of the essential signs allows to receive for the vehicle the average ground pressure 0.008–0.009 MPa, that ensures an increase of its cross country ability and a decrease of fuel consumption on grounds with a carrying capacity 0.015–0.03 MPa saving their vegetal soil layer, and also an increase of the velocity of its moving on water and facilitation of its moving out of water on coast and ice.

For solution of the problem in the pneumatic tyre containing side walls and ground engaging tread portion, the ratio of a mass of the tyre to its interior volume varies between 35–80 kg/M³, and the percent radial deflection of the tyre with atmospheric interior pressure under the influence of its own mass and a mass of the wheel ranges between 15–45% of the tyre section height.

The working interior pressure in the tyre equals 0.005–0.05 MPa.

The tyre section width is more than the tyre section height.

The side walls thickness of the tyre ranges between 0.0025–0.0050 of its overall diameter, and the thickness of the ground engaging tread portion varies between 1.5–2.0 of said side wall thickness.

The pattern of the ground engaging tread portion has recesses and bosses and the latter are distributed on the surface of the ground engaging tread portion uniformly and their height does not exceed 0.015 of the overall diameter of the tyre, and the ratio of the boss surface area to the total surface area of the ground engaging porton ranges between 0.1–0.2.

The tyre is made of oligomer material.

The tyre contains the cord plies carcass, cords of which form an angle to a meridian of said tyre.

The tyre contains the inner tube.

The ratio of a mass of the tyre to its interior volume defines a total rigidity of the tyre with the wheel including own rigidity of the tyre and resiliency of air. The average ground pressure in a zone of contact of the tyre with a ground depends on this rigidity mainly when interior pressure in the tyre is above 0.01 MPa. If interior pressure in the tyre is 0.01 MPa and less its own rigidity is the key factor influencing on the average pressure in a zone of contact of the tyre with a ground. This rigidity is characterized by a relative radial deflection of the tyre with atmospheric interior pressure under the influence of its own mass and mass of the wheel.

Utiltzation of the claimed totality of the essential signs of the tyre by the way of limits of parameters describing a total rigidity of the tyre with the wheel and own rigidity of the tyre, ensures the average pressure in a zone of contact with a ground ranging between 0.008–0.009 MPa with interior pressure in the tyre 0.005 MPa.

It allows to increase cross country ability and fuel economy of the vehicle with these tyres moving on grounds with a carrying capacity 0.015–0.03 MPa and to save a vegetal soil layer.

If the side walls thickness of the tyre varies between 0.0025–0.0050 of its overall diameter, and the tyickness of the ground engaging tread portion ranges between 1.5–2.0 of said side wall thickness, it allows to distribute an own rigidity of the tyre along its profile in such a way, that with interior pressure in the tyre 0.005 MPa not only decreasing of ground pressure and its optimum distribution in a zone of contact are ensured, but also the stability of the tyre profile shape is maintained.

The side walls thickness of the tyre depends on its overall diameter because the latter has a decisive influence on the cross country ability of the vehicle.

The tread pattern consisting of recesses and bosses, distributed on a surface of the ground engaging tread portion of the tyre uniformly, with recesses height not exceeding 0.015 of the tyre overall diameter, and with the the ratio of the boss surface area to the total surface area of the ground engaging tread portion equaled 0.1–0.2, promotes uniform ground stabilization in a contact zone without its destruction and improvement of adhesion of tyres.

The application of an oligomer material allows to simplify manufacture of the tyres useing the process of die casting.

BRIEF DESCRIPTION OF ACCOMPANYING DRAWINGS

FIG. 1 The vehicle outline.

Figure 2:
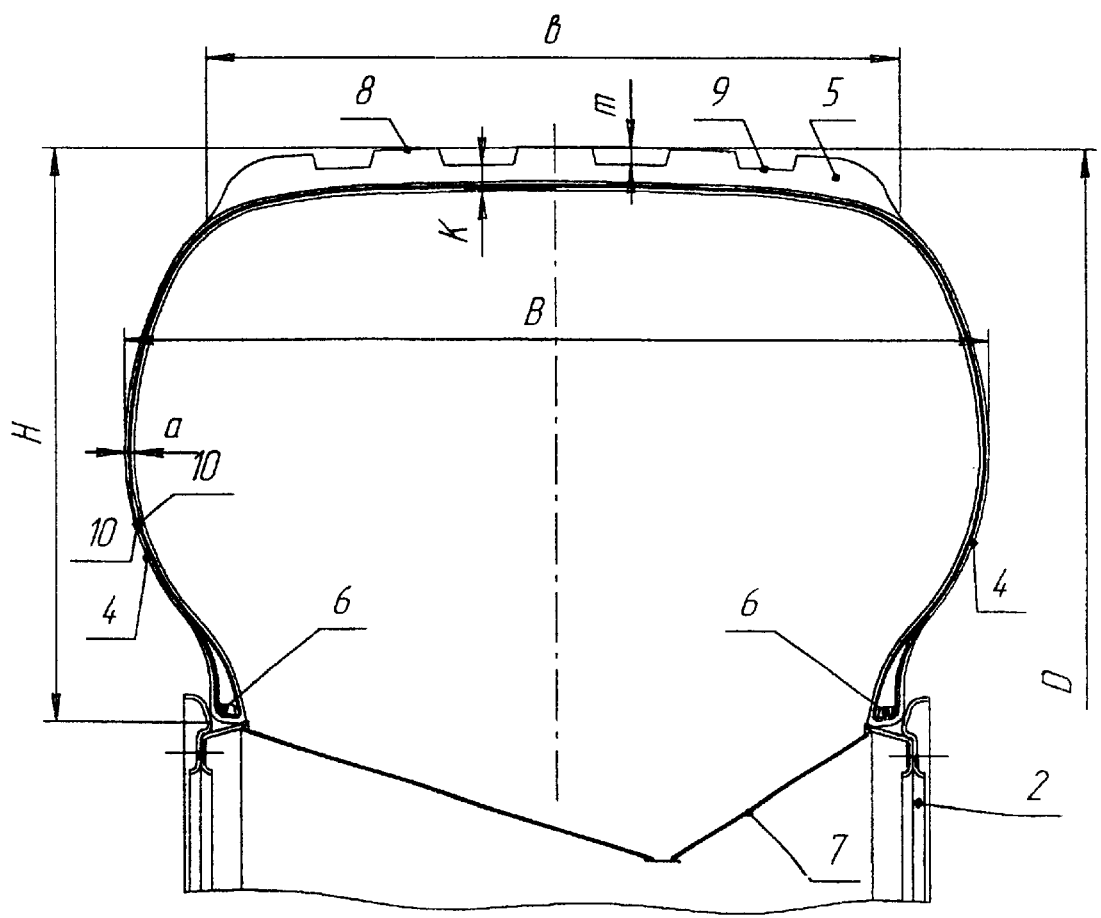

FIG. 2 The radial section of the tyre with a rim.

Figure 3:
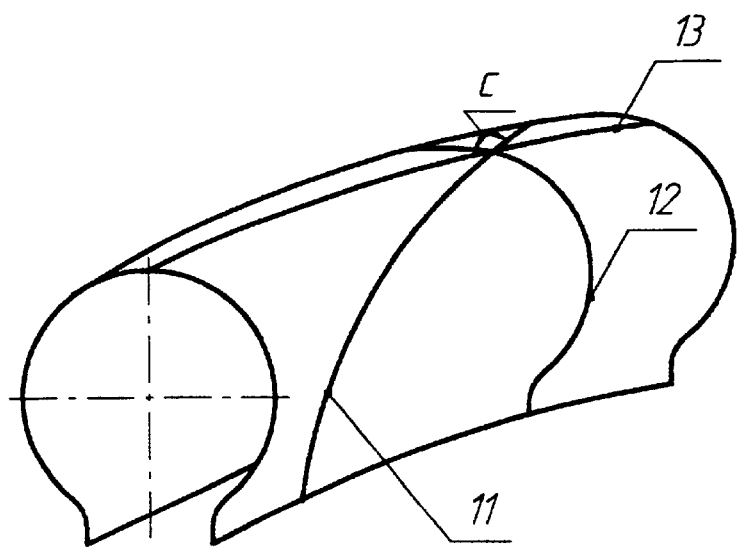

FIG. 3 The outline of a cord arrangement in a carcass ply.

Figure 4:
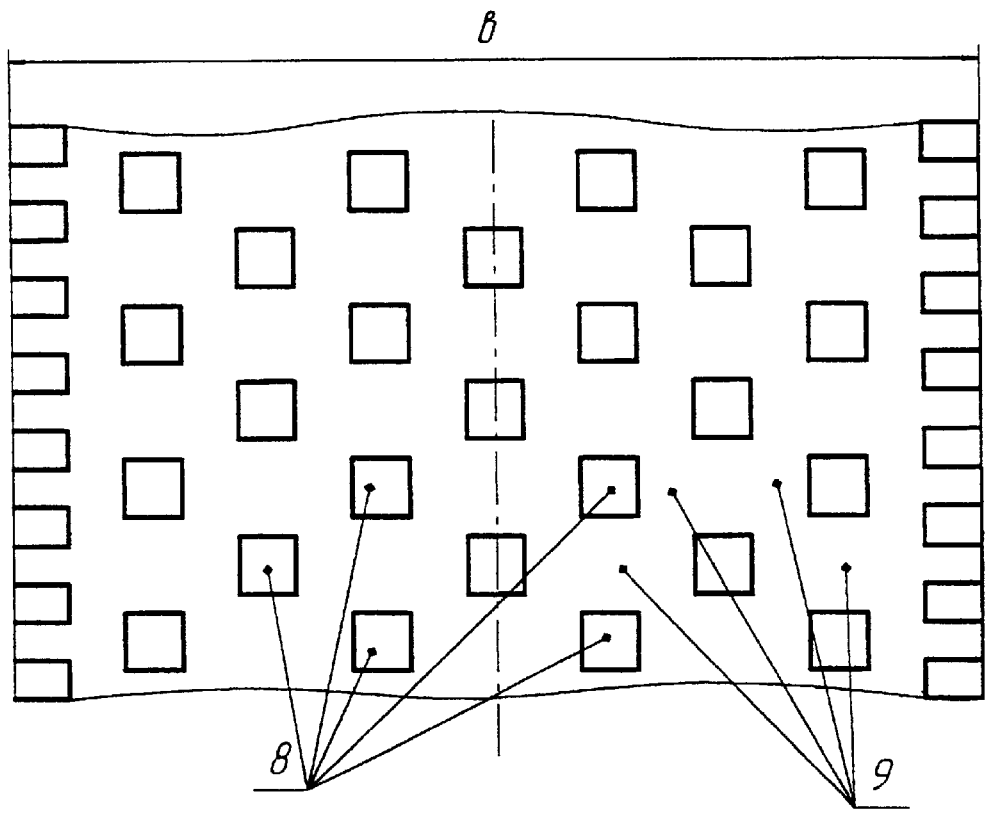

FIG. 4 The fragment of a design version of a tread pattern.

Figure 5:
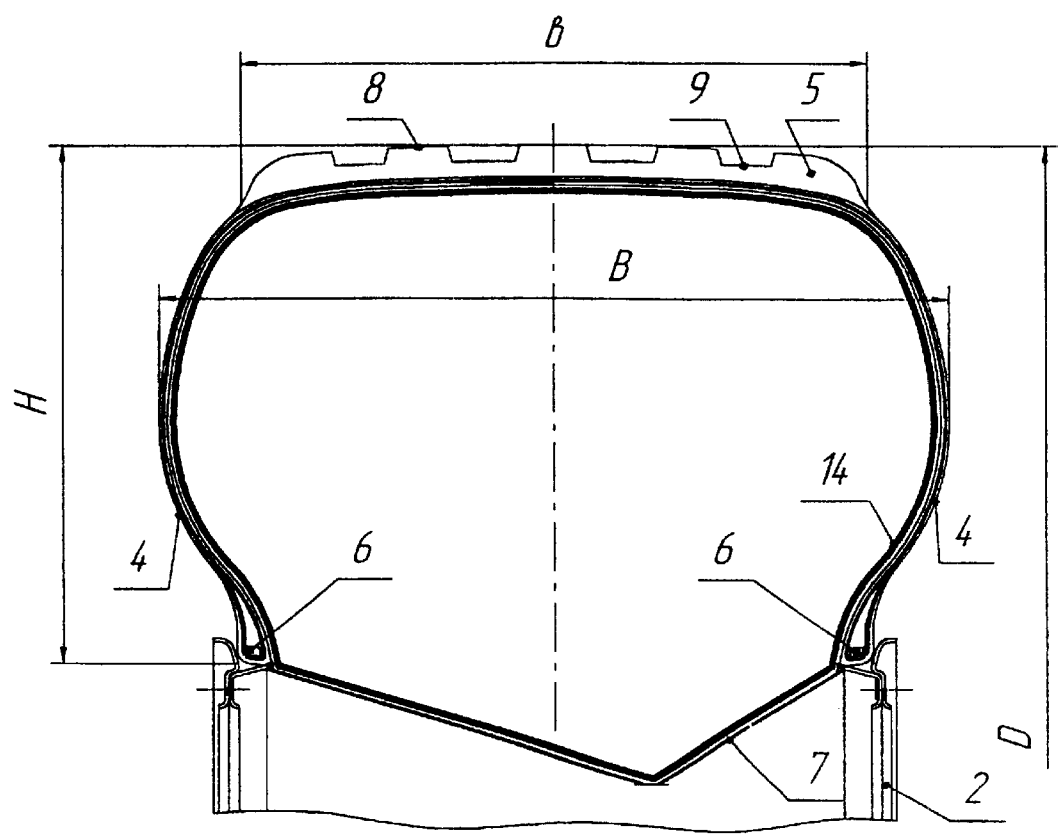

FIG. 5 The radial section of the tyre with an inner tube and a rim.

VARIANT OF A REALIZATION OF THE INVENTION

The wheel-mounted vehicle (FIG. 1) contains the body 1 and wheels 2 fitted with pneumatic tyres 3. The body 1 can be made faulty sealing, single-volumetric, multi-volumetric, in the form of pick-up, platform etc.

The ratio of the total mass of the vehicle to product of the overall diameter D (FIG. 2) of the tyre 3, its section width B and number n of the wheels 2 fitted with the tyres 3 ranges between 0.001–0.006 MPa, and the ratio of the mass of each tyre 3 to its internal volume varies between 35–80 kg/M$^3$.

The indicated relations in the claimed limits ensure displacement of the wheels 2 fitted with the tyres 3, sufficient for crossing water obstacles by the vehicle, not resting the wheels on a bottom, with incomplete immersion of the tyres 3 in water, and average ground pressure of the vehicle 0.008–0.009 MPa.

If the ratio of the total mass of the vehicle to product of the overall diameter D of the tyre 3, its section width B and number n of the wheels 2 fitted with the tyres 3 is less 0.001 MPa the arrangement of the vehicle becomes complicated by excessive enlargment of the tyre sizes, or the cargo capacity of the vehicle is reduced at the expense of the significant decrease of the total mass.

If this ratio is more 0.006 MPa, the ground pressure increases and the cross country ability and the fuel economy of the vehicle become worse on the deformable grounds with a small carrying capacity.

If the ratio of the mass of the tyre 3 to its interior volume is less than 35 kg/ M$^3$ the process of tyres manufacture becomes complicated and the controllability of the vehicle becomes worse while moving on deformable grounds with small interior pressure in the tyres 3.

If the ratio of the mass of the tyre 3 to its interior volume is more than 80 kg /M$^3$ the total rigidity of the wheels 2 fitted with the tyres 3 excessively increases and the equipped mass of the vehicle increases also, and it causes an increase of the ground pressure and a decrease of the cross country ability and fuel economy of the vehicle on deformable grounds.

In the best version of a realization of the invention with reference to easy vehicles the ratio of their total mass to product of the overall diameter D of the tyre 3, its section width B and number n of the wheels 2 fitted with the tyres 3 ranges between 0.0030–0.0035 MPa, and the ratio of the mass of the tyre 3 to its interior volume —40–45 kg/M$^3$.

Such vehicles not only have high cross country ability, consume a little fuel, do not destroy a vegetal soil layer moving on deformable grounds with a carrying capacity 0.015 MPa and above, but also have a small draught (waterline always is below than axes of the wheels 2). The last circumstance promotes a decrease of move resistance and an increase of a move velocity in water at the expense of a decrease of cross section of the vehicle units immersed in water. The disposition of the axes of the wheels 2 above water surface facilitates moving the vehicle out of water on a coast, and while crossing ice-holes in frozen ponds ensures a possibility to catch on the edge of ice by the tyres 3, promoting an independent moving out of the vehicle on ice.

In the best version of a realization of the invention with reference to heavier passenger and cargo vehicles the ratio of their total mass to product of the overall diameter D of the tyre 3, its section width B and number n of the wheels 2 fitted with the tyres 3 varies between 0.0045–0.0050 MPa, and the ratio of the mass of the tyre 3 to its interior volume —45–50 kg/M$^3$.

Interior pressure in the tyres 3 of the vehicle can be reduced up to 0.005 MPa, moving on deformable grounds. The average ground pressure of the wheels 2 fitted with the tyres 3 ranges between 0.008–0.009 MPa in such conditions.

The conducted researches reveal, that the ground pressure of the vehicle should be no more than 0.6 of the ground carrying capacity to ensure steady moving of the vehicle on a deformable ground and to save vegetal soil layer. Therefore ground deformations are insignificant, while moving with interior pressure in the tyres 3 0.005 MPa even on very weak grounds with a carrying capacity 0.015–0.03 MPa, and they do not cause destruction of the vegetal soil layer, promoting an increase of adhesion of the tyres 3 and of cross country ability of the vehicle on such grounds.

At the same time, with a decrease of work of ground deformation, the vehicle moving resistance is reduced and the fuel consumption falls accordingly. The pneumatic tyre 3 (FIG. 2) contains side walls 4, ground engaging portion b, tread 5 and beads 6, fixed on rim flanges 7 of the wheel 2. The interior pressure in the tyre 3 varies between 0.005–0.05 MPa. The section width of the tyre B is more than its section height H.

The tyre has a carcass plies 10, cords 11 of which (FIG. 3) form an angle C to a meridian 12. An angle C in a crosspoint of a meridian 12 of the tyre with its equator 13 ranges between 50–60 degrees. That angle can be 0 degrees in a specific case. The cord can be made of polyamid, viscose and other materials. The ratio of a mass of the tyre 3 to its interior volume varies between 35–80 kg/M$^3$. Interior volume of the tyre 3 is understood to be a volume confined to an interior surface of the tyre 3 and by surface of the rim 7 turned into it. Interior volume of the tyre 3 can be defined by the following way. The wheel 2 assembled with the tyre 3, and separately the tyre 3 and the wheel 2 with units of the rim 7 are immersed into a bath of water sequentially. A volume of displaced water is stated every time. The difference between the volume of water displaced by the wheel 2 assembled with the tyre 3 and the sum of the volumes of water, displaced separately by the tyre 3 and the wheel 2 with units of the rim 7, corresponds to an interior volume of the tyre 3.

Tyre deflection ranges between 15–45% of the tyre section height H while loading the tyre with a radial load equaled to own mass of the wheel 2 fitted with the tyre 3 and atmospheric interior pressure in the tyre 3.

The percent tyre deflections in claimed limits characterize an own radial rigidity of the tyre 3, which provide a contact surface with a ground sufficient for the average ground pressure to be 0.008–0.009 MPa when interior pressure in the tyre 3 is 0.005 MPa. If percent tyre deflections of the tyre 3 with atmospheric interior pressure under the influence of the own mass of the wheel 2 fitted with the tyre 3 are less than 15%, radial rigidity of the tyre 3 has such a value that a contact surface with a ground remains constant while lowring pressure in the tyre 3 below 0.01 MPa. The cross country ability of the vehicle with such tyres 3 is reduced on grounds with a carrying capacity 0.3 MPa and less. If percent tyre deflections of the tyre 3 with atmospheric interior pressure under the influence of the own mass of the wheel 2 fitted with the tyre 3 are more than 45%, radial rigidity of the tyre 3 is so small, that the latter loses a profile stability when interior pressure is less 0.01 MPa. The vehicle controllability becomes worse in these conditions.

The tread pattern of the tyre 5 (FIG.) has bosses 8 and recesses 9. The bosses 8 distributed on a surface of the ground engaging portion b uniformly, and their height m does not exceed 0.015 D. The ratio of the boss surface area to the total surface area of the ground engaging portion b varies between 0.1–0.2. If the ratio is less than 0.1, pressure on the bosses 8 increases and their wear rises on a rigid road. If the ratio is more than 0.2 adhesion of the tyre deteriorate.

The thickness α of the side walls 4 of the tyre ranges between 0.0025–0.0050 of its overall diameter D, and the thickness k of the ground engaging portion b up to the base of the bosses 8 of the tread pattern 5 varies between 1.5–2.0 of the thickness α of the side walls.

If the thickneeses α of the side walls and k of the ground engaging portion are performed in claimed limits, own rigidity of the tyre 3 is distributed to the tyre profile in such a way, that stability of the tyre profile remains and the optimum distribution of the ground pressures in a contac zone is ensured with falling of interior pressure in the tyre 3 up to 0.005 MPa.

If the thickness α of the side walls 4 is less than 0.0025D, folds can appear on them when interior pressure in the tyre less than 0.01 MPa, that sharply increases rolling resistance of the tyres 3 and make worse a controllability of the vehicle.

If the thickness α of the side walls 4 is more than 0.005D, the radial deflection of the tyre 3 remains permanent practically when interior pressure in the tyre falls from 0.01 MPa up to 0.005 MPa, and the ground pressure is 0.015 MPa and above. In these conditions cross country ability of the vehicle on grounds with a carrying capacity less 0.03 MPa is reduced and the fuel consumption rise.

Realisation of the thickness k of the ground engaging portion b less than 1.5 a, promotes irregular ground pressure distribution when interior pressure in the tyre 3 less than 0.01 MPa. In this case moving of the vehicle on grounds with a carrying capacity less 0.03 MPa is accompanied by significant ground local deformations which cause destruction of the vegetal soil layer, lowering of cross country ability and increase of fuel consumption.

An increase of the thickness k of the ground engaging portion b of the tyre 3 more than 2 a makes worse its ability "to adapt" to ground irregularities comparable on a size to the tyre profile when interior pressure is less than 0.01 MPa, that reduces cross country ability of the vehicle on grounds with a small carrying capacity. At the same time, while moving on hard roads, the hysteresis losses in the ground engaging portion b of the tyre 3 increase in this case and fuel consumption increase accordingly.

The tyre 3 contains the inner tube 14 (FIG. 5).

In the best version of a realization of the invention:

the ratio of the mass of the tyre 3 to its interior volume ranges between 40–50 kg/M$^3$ from the claimed range 35–80 kg/M$^3$;

the relative radial deflection of the tyre 3 with atmospheric internal pressure varies between 17–30% from the claimed range 15–45%

Industrial Applicability

The floating cross country vehicle and the pneumatic superlow pressure tyre for it can be used most efficiently in regions in permafrost regions, in the tundra, in swamped areas, in sand deserts as well as other remote regions. They also can cross afloat easily small ponds and move on usual roads. Key feature of such vehicles is that their effect on a ground allows to keep vegetal soil layer undamaged.

We claim:

1. A wheel mounted vehicle containing wheels (2) fitted with pneumatic tyres (3), wherein a total mass of the vehicle is connected with the dimensions of said tyres (3) in accordance with the following relation:

$$\frac{M}{DBn}10^{-5} = 0.001 - 0.006 \text{ MPa},$$

where:

M is the total mass of said vehicle, kg

D is an overall diameter of said tyre, m

B is a section width of said tyre, m n is a number of wheels of said vehicle and the ratio of a mass of each said tyre (3) to an interior volume of said tyre varies between 35–80 kg/M$^3$.

2. The wheel mounted vehicle according to claim 1 wherein, said number n of wheels is 3 or more.

* * * * *